United States Patent
Dries et al.

(10) Patent No.: US 10,472,456 B2
(45) Date of Patent: Nov. 12, 2019

(54) COMPOSITION TO REDUCE THE AMOUNT OF ALDEHYDES EMITTED FROM POLYURETHANE FOAMS

(71) Applicant: Huntsman Petrochemical LLC, The Woodlands, TX (US)

(72) Inventors: Geert Lodewijk Dries, Zonhoven (BE); Eugene P Wiltz, Jr., The Woodlands, TX (US); Robert Allison Grigsby, Jr., Spring, TX (US)

(73) Assignee: HUNTSMAN Petrochemical LLC, The Woodlands, TX (US)

( * ) Notice: Subject to any disclaimer, the term of this patent is extended or adjusted under 35 U.S.C. 154(b) by 80 days.

(21) Appl. No.: 15/318,712

(22) PCT Filed: Jul. 9, 2015

(86) PCT No.: PCT/EP2015/065657
§ 371 (c)(1),
(2) Date: Dec. 14, 2016

(87) PCT Pub. No.: WO2016/005479
PCT Pub. Date: Jan. 14, 2016

(65) Prior Publication Data
US 2017/0129988 A1  May 11, 2017

Related U.S. Application Data

(60) Provisional application No. 62/022,928, filed on Jul. 10, 2014.

(30) Foreign Application Priority Data

Jul. 24, 2014  (EP) .................................... 14178274

(51) Int. Cl.
C08G 18/32 (2006.01)
C08G 18/38 (2006.01)
C08G 101/00 (2006.01)

(52) U.S. Cl.
CPC ....... *C08G 18/325* (2013.01); *C08G 18/3275* (2013.01); *C08G 18/3848* (2013.01); *C08G 18/3887* (2013.01); *C08G 2101/0083* (2013.01)

(58) Field of Classification Search
CPC ............ C08G 18/1825; C08G 18/1833; C08G 18/325; C08G 18/3275; C08G 18/3293; C08G 18/3848; C08G 18/3887; C08G 18/4841; C08G 18/7664; C08G 2101/0083
See application file for complete search history.

(56) References Cited

U.S. PATENT DOCUMENTS

| 7,879,928 | B2 * | 2/2011 | Goh ..................... C08K 5/0008 524/243 |
| 2010/0099785 | A1 * | 4/2010 | Rister, Jr. ............. C08G 18/089 521/128 |
| 2010/0113634 | A1 * | 5/2010 | Tokumoto ............ C08G 18/161 521/115 |
| 2011/0009512 | A1 | 1/2011 | Grigsby, Jr. et al. |
| 2013/0203880 | A1 | 8/2013 | Emmanuel et al. |
| 2015/0191564 | A1 | 7/2015 | Dries et al. |

FOREIGN PATENT DOCUMENTS

| DE | 10003157 A | 8/2001 | |
| EP | 2703421 A | 3/2014 | |
| JP | H11-60721 A | 3/1999 | |
| JP | H11-197501 A | 7/1999 | |
| JP | 2007-297535 A1 | 11/2007 | |
| JP | 2008-536991 A | 9/2008 | |
| JP | 2010-516845 A | 5/2010 | |
| JP | 2013-516539 A | 5/2013 | |
| WO | 2009/117479 A | 9/2009 | |
| WO | WO-2011084865 A1 * | 7/2011 | ......... C08G 18/1825 |
| WO | 2014/026802 A | 2/2014 | |
| WO | 2014/026802 A1 | 2/2014 | |

* cited by examiner

*Primary Examiner* — John M Cooney
(74) *Attorney, Agent, or Firm* — Huntsman Petrochemical LLC; Lewis Craft

(57) ABSTRACT

An isocyanate reactive composition comprising
At least one component selected from the group consisting of an isocyanate reactive component;
a treating agent selected from the group consisting of cyclic urea substituted with at least one isocyanate reactive group, a free radical scavenger, or a polymer acid, or a mixture thereof;
one or more amine components, each of said amine components having a given structure.

20 Claims, No Drawings

COMPOSITION TO REDUCE THE AMOUNT OF ALDEHYDES EMITTED FROM POLYURETHANE FOAMS

CROSS-REFERENCE TO RELATED APPLICATIONS

This application is the National Phase of International Application PCT/EP2015/065657 filed Jul. 9, 2015 which designated the U.S. and which claims priority to U.S. App. Ser. No. 62/022,928 filed Jul. 10, 2014 and European App. Serial No. 14178274.8 filed Jul. 24, 2014. The noted applications are incorporated herein by reference.

The present invention relates to isocyanate reactive compositions and methods to reduce the amount of aldehydes and/or dimethylformamide emitted from polyurethane foams by using said isocyanate reactive compositions.

Polyurethane and polyurea materials are well known in the art. Polyurethane and polyurea foams, in particular so-called flexible polyurethane and polyurea foams, are used in a multitude of applications.

More and more, the emission of components, such as in particular aldehyde components and dimethylformamide, is seen as a disadvantage.

Various attempts have been made to integrate so-called scavengers in the polyurethane foam. As an example DE10003157A1 discloses polymeric polyethylene imines being dissolved in a solvent, after which the solution is sucked into the foam structure. After drying or evaporation of the solvent, the polymeric molecules remain in the foam structure and act as aldehyde scavengers.

The process applying these polymers is cost and labor intensive, a significant amount of scavenging polymer is needed and the polymers are not necessarily all bonded to the chemical polyurethane or polyurea structure.

WO2009/117479 discloses a method comprising adding a primary amine containing compound to a tertiary amine catalyst and thereby reducing the quantity of formaldehyde in said tertiary amine catalyst by at least 50%. The aim of WO2009/117479 is to reduce the aldehyde formation within the catalyst and from that using the CERTIPUR standard test method to quantify the formaldehyde in foams.

Nowadays, the standards and regulations for emissions from polyurethane foam have become more stringent, especially within the automotive industry. The requirements within the automotive industry only allow very low emissions or almost no emissions of aldehydes, such as formaldehyde, and dimethylformamide from these polyurethane foams. Instead of using the CERTIPUR standard test method, a more stringent test method has to be used, namely the VDA 276 test method. Up to now, none of the state of the art methods is suitable to achieve very low to almost no aldehyde emissions from these polyurethane foams when using the VDA 276 test method. Some automotive OEM's specify formaldehyde emissions lower than 30 $\mu g/m^3$ for 1 kg foam measured according to the VDA 276 test method. Patent application WO2014/026802 describes a foam where the emission of formaldehyde is decreased, when using the VDA 276 test and where the foam was made using a composition comprising an amine component. However, the emission of acetaldehyde increased, compared with foam that was made of a composition not having the amine component.

It is an object of the present invention to provide a method to ease the integration of scavengers for aldehydes, in particular for formaldehyde and acetaldehyde in a polyurethane or polyurea material, in particular a polyurethane or polyurea foamed structure.

It is further an object of the present invention to provide a selection of components suitable for use as scavengers for aldehydes, in particular for formaldehyde and acetaldehyde in a polyurethane or polyurea material. And at the same time keeping low the Total VOC (TVOC) emissions measured according to VDA 278 from these foams.

It was surprisingly seen that certain amine components in combination with a cyclic urea and/or a free radical scavenger are capable of reducing the emission of formaldehydes and acetaldehydes from a polyurethane or polyurea material such that the emission values for aldehydes, as being tested using the VDA 276 standard test method, fulfill the requirements set up by the automobile industry.

According to a first aspect of the present invention, a composition is provided comprising at least one polyisocyanate reactive component selected from the group consisting of a polyether polyol, a polyester polyol, a polyether polyamine and a polyester polyamine;

a treating agent selected from a cyclic urea substituted with at least one isocyanate reactive group, a free radical scavenger, a polymer acid, or a mixture thereof; and one or more amine components having a structure according to one of the formulae

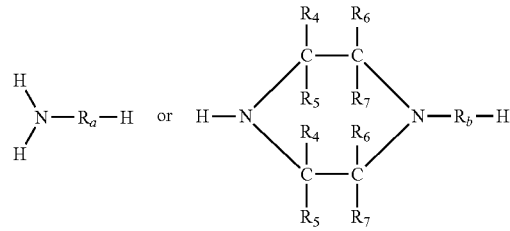

each of Ra and Rb independently being a random sequence of units R1 R2 and/or R3, for which R1 being

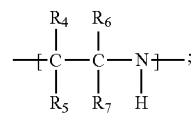

R2 being

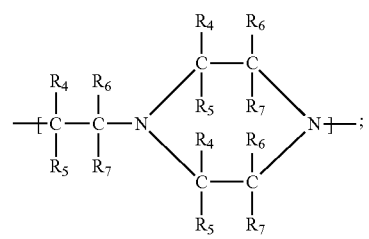

R3 being

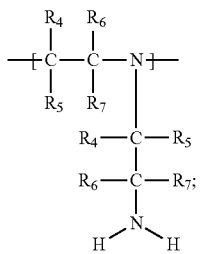

each of said R4, R5, R6 and R7 individually are —H or —CH$_3$;
wherein Ra is comprising 3 to 17 nitrogen atoms, Rb is comprising 2 to 16 nitrogen atoms.

With random sequence of units R1, R2 and/or R3 is meant that the amine component can have a sequence of R1, R2 and/or R3 wherein each of the formulas R1, R2 and/or R3 appears several times in the amine component, and wherein the amine component may comprise at least one of the formula R1, R2 or R3 or a combination of R1, R2, and/or R3. The sequence of units of R1, R2 or R3 in the amine component is preferably between 1-10 times, more preferably between 1-5 times. In one embodiment, the amine component comprises a sequence of units of R1, R2 or R3. In another embodiment, the amine component comprises a sequence of units of R1 and R2, R1 and R3 or R2 and R3.

The compositions according to the invention may also be referred to as isocyanate reactive compositions, suitable to react with the isocyanate groups of e.g. polyisocyanate components. This reaction may result in polyurea or polyurethane materials.

According to some embodiments, the average number of nitrogen atoms of said one or more amine components is in the range of 5 to 10.

The average number of nitrogen atoms is calculated according to the following definition:

$$F = \Sigma Vi^*(fi)^2 / \Sigma Vi^* fi, \text{ wherein}$$

Vi=volume fraction of component i;
fi=nitrogen atoms in component i.

According to some embodiments, the average number of nitrogen atoms of said one or more amine components may be in the range 5 to 8.

A typical average is between 6.5 and 7.5, e.g. about 7.

One or more amine components may comprise at least two, and preferably more than two amines according to said formulae. This may add up to 10 or more different amines, all having a structure according to one of said formulae. These at least two, and preferably more than two amines may be referred to as amine mixture.

It was found that of the one or more amine components with formulae as set out above, and when used in a process of providing PU foam by reacting an isocyanate reactive composition, comprising the one or more amine components, with a polyisocyanate component, act as a scavenger for aldehyde components (such as formaldehyde, acetaldehyde and propionaldehyde), and optionally also as for dimethylformamide (DMF). The one or more amine components with formulae as set out above itself can easily be included in the chemical structure of the polyurethane, as the primary and secondary amines are significantly reactive to the isocyanate groups of the polyisocyanate. As such the one or more amine components with formulae set out above are bond in the foam, while they influence little or even not the chemical and physical properties of the foam, seen its low molecular weight and the little amount that might be used.

According to preferred embodiments, the one or more amine components with formulae as set out above has at least one primary amine group and at least one secondary amine group. More preferable the one or more amine components has at least one component which has at least two primary amine groups and at least one secondary amine group.

According to alternative embodiments, the one or more amine components with formulae as set out above has at least two secondary amine groups.

As the one or more amine components with formulae as set out above is part of a reaction mixture suitable to provide polyurea or polyurethane, the foam, once made, need not to be post treated, such as by impregnation, to build in aldehyde scavenging properties in the foam.

In preferred embodiments, the amount of the one or more amine components in the composition is between 0.05% w to 2.5% w calculated on the total weight of the composition. More preferably, the amount of the one or more amine components all together may provide 0.05% w to 1% w, 0.1 to 1% w or even 0.2 to 0.7% w of said composition according to the invention.

According to some embodiments, all R4-, R5-, R6- and R7-groups in the amine component may be hydrogen. As such a composition is provided, which composition comprises At least one component selected from the group consisting of a polyether polyol, a polyester polyol, a polyether polyamine and a polyester polyamine;
one or more amine components, each of said amine components having a structure according to one of the formulae

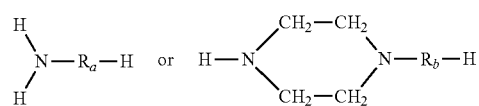

wherein each of Ra and Rb independently being a random sequence of units R1, R2 and/or R3, for which
R1 being

R2 being

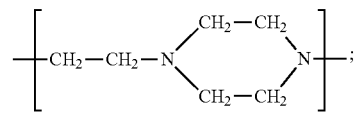

R3 being

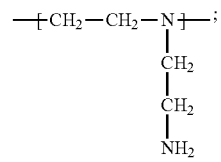

wherein Ra is comprising 3 to 17 nitrogen atoms and Rb is comprising 2 to 16 nitrogen atoms.

The amount of the one or more amine components in the composition is between 0.05 wt % to 1.0 wt % calculated on the total weight of the composition.

According to some embodiments, the one or more amine components may be a mixture comprising triethylene tetramines (TETA) and/or tetraethylene pentamines (TEPA) and/or pentaethylene hexamines (PEHA) and/or hexaethylene heptamines (HEHA) and/or heptaethylene octamines (HEOA) and/or octaethylene nonamines (OENO) and/or higher polyethylene amines. This mixture typically further comprises amine components with in total 9 to 18 nitrogen atoms in its structure. The mixture may be obtained by reacting ethylene dichloride (EDC) with ammonia at elevated pressure and temperatures. This mixture is than neutralized with caustic after which a distillation can separate the various amine components from the mixture. As a person skilled in the art knows, TETA, TEPA, PEHA, HEHA, HEOA, and OENA each comprise a mixture of ethyleneamines with close boiling points. For example, TEPA comprises besides N-(2-aminoethyl)-N'-{2-{(2-aminoethyl)amino}ethyl}-1,2-ethanediamine), also AETETA (4-(2-aminoethyl)-N-(2-aminoethyl)-N'-{2-{(2-aminoethyl)amino}ethyl}-1,2-ethanediamine), APEEDA (1-(2-aminoethyl)-4-[(2-aminoethyl)amino]ethyl]-piperazine) and PEDETA (1-[2-[[2-[(2-aminoethyl)amino]ethyl]amino]ethyl]-piperazine). As another example, TETA may comprise a mixture of TETA (N,N'-bis (2-aminoethyl)-1,2-ethanediamine), Bis AEP (N,N'-bis-(2-aminoethyl)piperazine), PEEDA (N-[(2-aminoethyl)2-aminoethyl]piperazine) Branched TETA (tris-(2-aminoethyl)amine).

According to some embodiments, the one or more amine components may be triethylene tetramines (TETA) and/or tetraethylene pentamines (TEPA). In these embodiments, and in particular where only triethylene tetramines (TETA) or only tetraethylene pentamines (TEPA) are included in the composition according to the invention, the one amine components may provide 0.1 to 1% w or even 0.2 to 0.7% w of said composition according to the invention. Also this embodiment may further comprise amine components with in total 9 to 18 nitrogen atoms in its structure.

The composition according to the invention has the further advantage that it is provided as a liquid under ambient conditions, facilitating the addition of this composition into a reactive mixture suitable to provide polyurethane or polyurea foam.

As described, the composition further comprises a polyisocyanate reactive component selected from the group consisting of a polyether polyol, a polyester polyol, a polyether polyamine and a polyester polyamine.

Given as examples of the polyether polyols are polyethylene glycol, polypropylene glycol, polypropylene glycol-ethylene glycol copolymer, polytetramethylene glycol, polyhexamethylene glycol, polyheptamethylene glycol, polydecamethylene glycol, and polyether polyols obtained by ring-opening copolymerisation of alkylene oxides, such as ethylene oxide and/or propylene oxide, with isocyanate-reactive initiators of functionality 2 to 8. Preferably the polyether polyols are based on propylene oxide, optionally in combination with up to 20 wt % (based on total alkylene oxides) of ethylene oxide.

Polyester diols obtained by reacting a polyhydric alcohol and a polybasic acid are given as examples of the polyester polyols. As examples of the polyhydric alcohol, ethylene glycol, polyethylene glycol, tetramethylene glycol, polytetramethylene glycol, 1,6-hexanediol, 3-methyl-1,5-pentanediol, 1,9-nonanediol, 2-methyl-1,8-octanediol, and the like can be given. As examples of the polybasic acid, phthalic acid, dimer acid, isophthalic acid, terephthalic acid, maleic acid, fumaric acid, adipic acid, sebacic acid, and the like can be given.

The term "isocyanate reactive component" or "polyisocyanate reactive component" as used herein includes any component with a "isocyanate reactive group(s)" or "isocyanate reactive moiety or moieties". The term "isocyanate reactive group" as use herein includes any group or moiety containing an active hydrogen group or moiety. For the purposes of this disclosure, an active hydrogen containing group refers to a group containing a hydrogen atom which, because of its position in the molecule, displays significant activity according to the Zerewitnoff test described by Wohler in the Journal of the American Chemical Society, Vol. 49, page 3181 (1927). Illustrative of such active hydrogen groups are —COOH, —OH, —NH$_2$, and —NH.

As described the composition according to the invention further comprises a treating agent. The treating agent can be a cyclic urea substituted with at least one isocyanate reactive group. The treating agent can also be a free radical scavenger. The treating agent can also be a polymer acid. The treating agent can be a mixture of a cyclic urea substituted with at least one isocyanate reactive group and a free radical scavenger. The treating agent can be the polymer acid alone, or a mixture of the polymer acid and the free radical scavenger or the cyclic urea, or a mixture of the polymer acid, the free radical scavenger and the cyclic urea.

According to one particular embodiment, the treating agent is a cyclic urea substituted with at least one isocyanate reactive group. The cyclic urea may be a cycloaliphatic or bicycloaliphatic compound having an element of the structure —NH—CO—NH— within a ring structure. In one embodiment, the cyclic urea has a total number of ring atoms ranging from 5 to 7. Such cyclic urea is substituted with at least one isocyanate reactive group on either the —N or —C atoms or both. In one particular embodiment, the cyclic urea substituted with at least one isocyanate reactive group has the formula (I):

where R', R$^{0'}$, R$^{1'}$, R$^{2'}$, R$^{3'}$, and R$^{4'}$ are independently selected from H, OH, R$^{11'}$OH, NH or COOH, and R$^{11'}$ is a C$_1$-C$_4$ alkyl group,
with the proviso that at least one of R' or R$^{0'}$ is H, and further with the proviso that at least: one of R', R$^{0'}$, R$^{1'}$, R$^{2'}$, R$^{3'}$, and R$^{4'}$ is OH, COOH, R$^{11'}$OH, or NH; or R$^{1'}$R$^{2'}$ or R$^{3'}$R$^{4'}$ is NH$_2$.

Examples of such compounds of formula (I) include, but are not limited to, 4,5-dihydroxy-2-imidazolidinone, 4,5-dimethoxy-2-imidazolidinone, 4-hydroxyethyl ethylene urea, 4-hydroxy-5-methyl propylene urea, 4-methoxy-5-methyl propylene urea, 4-hydroxy-5,5-dimethyl propylene urea, 1-(2-hydroxyethyl)-2-imidazolidinone or a mixture thereof.

According to another embodiment, the treating agent is a cyclic urea substituted with at least isocyanate reactive group having the formula (II):

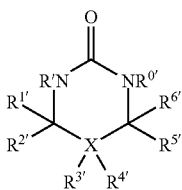

(II)

where R', R⁰', R¹', R²', R³', R⁴', R⁵' and R⁶' are independently selected from H, OH, R¹¹'OH, NH or COOH, and R¹¹' is a $C_1$-$C_4$ alkyl group, X is C, O or N with the proviso that when X is O, R³' and R⁴' are each zero and when X is N, one of R³' or R⁴' is zero, and further with the proviso at least one of R' or R⁰' is H and that at least: one of R⁰', R¹', R²', R³', R⁴', R⁵', R⁶' is OH, COOH, R¹¹'OH, or NH; or R¹'R²' or R⁵'R⁶' are $NH_2$.

Examples of such compounds of formula (II) include, but are not limited to, tetrahydro-5-(2-hydroxyethyl)-1,3,5-triazin-2-one, tetrahydro-5-(ethyl)-1,3,5-triazin-2-one, tetrahydro-5-(propyl)-1,3,5-triazin-2-one, tetrahydro-5-(butyl)-1,3,5-triazin-2-one or mixtures thereof.

According to another embodiment, the treating agent is a free radical scavenger. The free radical scavenger includes compounds such as, but not limited to, methimazole, phenyl methimazole, and derivatives thereof; allupurinol, propyl thiouracil, glutamine, diaminobenzylamine; nicotinamide; hindered phenols or hindered aliphatic or aromatic amines; phosphites; ditridecylthiodipropionate; and natural antioxidants such as Vitamin C, Vitamin E and/or glutathione. Especially preferred free radical scavengers are methimazole, sterically hindered phenols, sterically hindered aromatic amines, or phosphites.

According to one embodiment, the free radical scavenger is a hindered phenol. In another embodiment, the hindered phenol is a sterically hindered phenol. The term "sterically hindered phenol" as used herein means that the phenol in positions 2 and 6 of the aromatic ring have substituents which, on the basis of their three-dimensional size, shield the OH group of the phenolic ring and result in an attenuated reactivity. Thus, in one particular embodiment, the sterically hindered phenol is a compound having the formula (III):

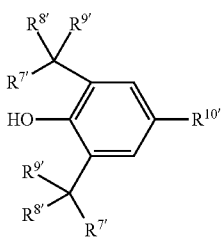

(III)

where R⁷', R⁸' and R⁹' are independently selected from H or a $C_1$-$C_{10}$ alkyl group and R¹⁰' is H or a $C_1$-$C_{12}$ alkyl group.

In one embodiment, R⁷', R⁸' and R⁹' are independently selected from H or a $CH_3$ group and R¹⁰' is H or a $C_1$-$C_4$ alkyl group. In still another embodiment, R⁷', R⁸' and R⁹' are each a $CH_3$ group and R¹⁰' is H, a methyl group, an ethyl group, a propyl group or an isopropyl group.

Examples of such compounds having formula (III) include, but are not limited to, 2,6-di-t-butyl-4-methyl phenol, 2,6-di-t-butyl-4-isopropyl phenol, 2,6-di-t-butyl-4-ethyl phenol, 2,4-dimethyl-6-octyl phenol, 2,6-di-t-butyl-4-n-butyl phenol and 2,4-dimethyl-6-t-butyl phenol, 3,5-bis(1,1-dimethylethyl)-4-hydroxy-benzenepropanoic acid branched C13-15 alkyl esters.

In another embodiment, the free radical scavenger is a phosphite. Examples of phosphites include, but are not limited to, triphenyl phosphite, trisnonlyphenyl phosphite, tris(p-cresyl) phosphite, triethyl phosphite, tris(2-ethylhexyl) phosphite, tridecyl phosphite, trilauryl phosphite, tris(tridecyl) phosphite, trioleyl phosphite, tris(dipropylene glycol) phosphite, diphenyl mono(2ethylhexyl) phosphite, diphenyl monodecyl phosphite, diphenyl mono(tridecyl) phosphite, trilauryl trithiophosphite, diisodecyl(phenyl) phosphite, diethyl hydrogen phosphite, bis(2-ethylhexyl) hydrogen phosphite; dilauryl hydrogen phosphite, dioleyl hydrogen phosphite, diphenyl hydrogen phosphite, tetraphenyl dipropyleneglycol diphosphite, tetraphenyl tetra(tridecyl) pentaerythritol tetraphosphite/bis(2-ethylhexyl)phthalate, tetra($C_{12}$-$C_{15}$ alkyl)-4,4'-isopropylidene diphenyl diphosphite, bis(tridecyl)pentaerythritol diphosphite/bis(nonylphenyl) pentaerythritol diphosphite, bis(decyl) pentaerythritol diphosphite, bis(tridecyl) pentaerythritol diphosphite, tristearyl phosphite, distearyl pentaerythritol diphosphite, tris(2,4-di-tert-butylphenyl) phosphite, hydrogenated bisphenol A pentaerythritol phosphite polymer, hydrogenated bisphenol A phosphite polymer, and mixtures thereof.

In another embodiment, the free radical scavenger is a sterically hindered amine. According to this invention a "sterically hindered amine" is a secondary amine having two substituted phenyl groups which, on the basis of their three-dimensional size, shield the amine group and result in an attenuated reactivity.

In one particular embodiment, the sterically hindered amine, is a substituted diphenyl amine aromatic amine compound having the formula (IV):

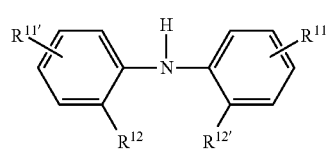

(IV)

wherein R11 and R11' are independently selected from H or a C1-C12 alkyl or aryl group and R12 and R12' are H or a C1-C4 alkyl group in case R11 or R11' are not positioned at that place.

Examples of hindered aromatic amines are 4,4'-bis(α,α-dimethylbenzyl)diphenylamine; benzenamine,4-octyl-N-(4-octylphenyl); Benzenamine,4-(1-methyl-1-phenlyethyl)-N-4[4-91-methyl-1-phenylethyl]phenyl]; Benzeneamine, ar-nonyl-N-nonylphenyl; Benzenamine, N-phenyl-reaction products with 2,4,4-trimethylpentene; Benzenamine, N-phenyl-,styrenated; Benzenamine,2-ethyl-N-(2-ethylphenyl)-(tripropenye) derivatives.

In yet another embodiment, the treating agent is a mixture of the cyclic urea substituted with at least one isocyanate reactive group described above and sterically hindered phenol described above.

In still another embodiment, the treating agent is a mixture of the cyclic urea substituted with at least one isocyanate reactive group described above and a phosphite described above.

In still another embodiment, the treating agent is a "polymer acid". For the purpose of this disclosure, "polymer acid" is defined in two ways. First, the "polymer acid" is any material containing three or more of the same repeating monomers of either an unsaturated carboxylic acid or an anhydride. Second, the "polymer acid" is any material containing at least two repeating monomers, wherein the first monomer is either an unsaturated carboxylic acid or an anhydride, and the second monomer is different from the first monomer. Thus, in an embodiment where the first monomer is an unsaturated carboxylic acid, the second monomer may be a different unsaturated carboxylic acid, an anhydride, or an alternative monomer. Alternatively, in an embodiment where the first monomer is an anhydride, the second monomer may be an unsaturated carboxylic acid, a different anhydride or an alternative monomer. In one embodiment, the alternative monomer to the unsaturated carboxylic acid and anhydride is a vinyl monomer, such as, but not limited to, styrene, ethylene, propylene, butylene, acrylonitrile, and vinyl chloride.

The unsaturated carboxylic acid and anhydride of the polymer acid may be any acid containing at least one double bond, which is capable of being polymerized with either itself or another acid or anhydride monomer, or any non-acid containing monomer. Examples of unsaturated carboxylic acids and anhydrides include, but are not limited to, acrylic acid, methacrylic acid, maleic acid, maleic anhydride, succinic acid, succinic anhydride, furoic acid, fumaric acid, sorbic acid, tiglic acid, linoleic acid, linolenic acid, licanic acid, and other acids containing double bonds which are capable of reacting with ethylenic unsaturated monomers or dimers.

In one embodiment, the polymer acid contains at least three or more of the same repeating monomers selected from the group consisting of acrylic acid, methacrylic acid, maleic acid, maleic anhydride, furoic acid, fumaric acid, sorbic acid, tiglic acid, linoleic acid, linolenic aid and licanic acid.

In another embodiment, the polymer acid contains at least two repeating monomers where the first monomer is an unsaturated carboxylic acid and the second monomer is a different unsaturated carboxylic acid, an anhydride or an alternative monomer. In one particular embodiment, the unsaturated carboxylic acid may be selected from the group consisting of acrylic acid, methacrylic acid, maleic acid, furoic acid, fumaric acid, sorbic acid, tiglic acid, linoleic acid, linolenic aid and licanic acid. In yet another embodiment, the anhydride and the alternative monomer when present may be selected from the group consisting of maleic anhydride, styrene, ethylene, propylene, butylene, acrylonitrile and vinyl chloride.

In still another embodiment, the polymer acid contains at least two repeating monomers where the first monomer is an anhydride and the second monomer is a different anhydride, an unsaturated carboxylic acid or an alternative monomer. In one particular embodiment, the anhydride may be maleic anhydride. In another embodiment, the unsaturated carboxylic acid or alternative monomer when present may be selected from the group consisting of acrylic acid, methacrylic acid, maleic acid, furoic acid, fumaric acid, sorbic acid, tiglic acid, linoleic acid, linolenic aid, licanic acid, styrene, ethylene, propylene, butylene, acrylonitrile and vinyl chloride.

The addition of the polymer acid to the composition according to the invention, has as advantage that the foam made from the composition can be more homogenous and stable compared when no polymer acid is added to the composition. This is because the reactivity of the amine in the composition is reduced by the polymer acid.

According to a second aspect of the present invention, a method for reducing the emission of formaldehyde and/or acetaldehyde from a polyurethane or polyurea foam, by using a composition as described above in the first aspect of the invention in a reaction mixture to produce said polyurethane or polyurea foam is provided.

It is to be understood that the embodiments, preferred embodiments and advantages described for the first aspect describing the composition of the invention apply mutatis mutandis for the second aspect of the invention, wherein the method for preparing the polyurethane or polyurea foam the composition of the first aspect of the invention is used.

The reaction mixture in the method of the invention thus comprises at least one isocyanate reactive component selected from the group consisting of a polyether polyol, a polyester polyol, a polyether polyamine and a polyester polyamine; a treating agent selected from a cyclic urea substituted with at least one isocyanate reactive group, a free radical scavenger and a mixture thereof; and one or more amine components, all as described above in the first aspect of the invention.

In one embodiment, the reaction mixture in the method of the invention further comprises an isocyanate component, a catalyst selected from a blowing and/or gelling catalysts, and optionally fire retardants, antioxidants, surfactants, physical or chemical blowing agents, fillers, pigments, or any other typical additives used in polyurethane materials.

In one embodiment the amount of the one or more amine components in the reaction mixture is between 0.05% w to 0.50% w calculated on the total weight of the reaction mixture.

According to preferred embodiments, the total weight of the one or more amine components all together is 0.10% w to 0.35% w of the reaction mixture to produce said polyurethane or polyurea foam.

In one embodiment the amount of the treating agent in the reaction mixture is between 0.05% w to 2% w, preferably between, more preferably between 0.05 and 0.5% w calculated on the total weight of the reaction mixture.

According to preferred embodiments, the total weight of the treating agents all together is 0.05 to 1% w or even 0.10% w to 0.45% w of the reaction mixture to produce said polyurethane or polyurea foam.

According to preferred embodiments, the reaction mixture further comprises a isocyanate component.

The isocyanate component is preferably a polyisocyanate and may comprise any number of polyisocyanates, including but not limited to, toluene diisocyanates (TDI), diphenylmethane diisocyanate (MDI)-type isocyanates, and prepolymers of these isocyanates.

The diphenylmethane diisocyanate (MDI) used in the present invention can be in the form of its 2,4'-, 2,2'- and 4,4'-isomers and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than 2, or any of their derivatives having a urethane, isocyanurate, allophonate, biuret, uretonimine, uretdione and/or iminooxadiazinedione groups and mixtures of the same.

Examples of other suitable polyisocyanates are tolylene diisocyanate (TDI), hexamethylene diisocyanate (HDI), isophorone diisocyanate (IPDI), butylene diisocyanate, trimethylhexamethylene diisocyanate, dicyclohexylmethane diisocyanate (H12MDI), di(isocyanatocyclohexyl)methane, isocyanatomethyl-1,8-octane diisocyanate and tetramethylxylene diisocyanate (TMXDI).

Semi-prepolymers and prepolymers which may be obtained by reacting polyisocyanates with compounds containing isocyanate-reactive hydrogen atoms may also be used. Examples of compounds containing isocyanate-reactive hydrogen atoms include alcohols, glycols or even relatively high molecular weight polyether polyols and polyester polyols, mercaptans, carboxylic acids, amines, urea and amides. Examples of suitable prepolymers are reaction products of polyisocyanates with monohydric or polyhydric alcohols.

The prepolymers are prepared by conventional methods, e.g. by reacting polyhydroxyl compounds which have a molecular weight of from 400 to 5000, in particular mono- or polyhydroxyl polyethers, optionally mixed with polyhydric alcohols which have a molecular weight below 400, with excess quantities of polyisocyanates, for example aliphatic, cycloaliphatic, araliphatic, aromatic or heterocyclic polyisocyanates.

The method according to the invention may be used to provide polyurethane or polyurea (PU) foams such as flexible PU foam, semirigid PU foam, rigid PU foam, viscoelastic PU foam, integral skin PU foam, hydroponic PU foam and alike. In particular it is useful in PU foam applications such as mattresses, bedding foam and automotive PU foam, in particular conventional flex foam, HR flex foam, visco elastic flex foam, but also semi rigid and rigid foam.

According to a third aspect, the invention is related to a process for making the composition according to the invention, comprising the steps of:
 providing one or more amine component having a structure as described in the first aspect of the invention;
 adding a treating agent as described above in the first aspect of the invention;
 adding at least one isocyanate reactive component as described above in the first aspect of the invention.

In one embodiment of this aspect, the process further comprises the addition of a polymer acid as described above in the first aspect of the invention to the one or more amine component, before adding the treating agent. In case the composition comprises a polymer acid, it is important that the acid is added to the amine component before the treating agent is added to the mixture, in order to obtain a homogenous composition. The independent and dependent claims set out particular and preferred features of the invention. Features from the dependent claims may be combined with features of the independent or other dependent claims as appropriate.

The above and other characteristics, features and advantages of the present invention will become apparent from the following detailed description which illustrate, by way of example, the principles of the invention. This description is given for the sake of example only, without limiting the scope of the invention.

The present invention is described with respect to particular embodiments.

It is to be noticed that the term "comprising", used in the claims should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

In the context of the present invention the following terms have the following meaning:
1) Unless otherwise indicated, reference to % w, w % or percentage by weight of a given component refers to the weight of said component, expressed as percentage, over the total weight of the composition in which said component is present at that moment in time.
2) The VDA 276 test method is an emission measurement method to measure the emissions from a foam sample done in a 1 m$^3$ chamber where the foam is exposed to 65° C. and 5% RH for several hours. VDA 276 (Verband Der Automobil industrie) is a specific automotive emission method used by a host of automotive OEM's (original equipment manufacturers) to specify the permissible emission levels coming from automotive interior parts.
3) isocyanate index or NCO index or index: the ratio of NCO-groups over isocyanate-reactive hydrogen atoms present in a formulation, given as a percentage:

$$\frac{[NCO] \times 100}{[active - H]} (\%)$$

In other words the NCO-index expresses the percentage of isocyanate actually used in a formulation with respect to the amount of isocyanate theoretically required for reacting with the amount of isocyanate-reactive hydrogen used in a formulation.

EXAMPLES

Example 1

Several isocyanate reactive compositions are provided comprising the following ingredients as further indicated in Table 1.
 100 gram Daltocel®F428 supplied by Huntsman International
 4 gram Daltocel®F526 supplied by Huntsman International.
 4 gram water
 0.15 gram JEFFCAT® LED-103 supplied by Huntsman International
 1 gram JEFFCAT®DPA supplied by Huntsman International
 0.25 gram diethanolamine (DELA);
 0.9 gram foam stabilizer available as Tegostab B8734 LF2 from Evonik. Tegostab B 8734 LF2 is a low fogging siloxane based surfactant
 0.33 gram amine component—in this example Tetraethylene pentamine (TEPA supplied by Huntsman).

0.67 gram treating agent 1e, which contains a mixture of hydroxyethyl ethylene urea and tris(dipropylene glycol) phosphite.

TABLE 1

Overview of compounds in several compositions

| Foam evaluations | | A | B | E |
|---|---|---|---|---|
| Daltocel ® F 428 | pbw | 100 | 100 | 100 |
| Daltocel ® F 526 | pbw | 4 | 4 | 4 |
| DELA | pbw | 0.25 | 0.25 | 0.25 |
| Tegostab ® B 8734 LF-2 | pbw | 0.9 | 0.9 | 0.9 |
| Water | pbw | 4 | 4 | 4 |
| JEFFCAT ® LED-103 | pbw | 0.15 | 0.15 | 0.15 |
| JEFFCAT ® DPA | pbw | 1 | 1 | 1 |
| Amine component | mix 9002-1-A | | 0.33 | 0.33 |
| "treating agent" 1e | mix 9002-1-I | | | 0.67 |
| Suprasec ® 2447 | pbw | 52 | 52 | 52 |
| INDEX | | 80 | 80 | 80 |

In comparative example A, no treating agent and no amine component were added.

In example B, 0.33% w of the amine component as described above was added. The w % is based upon the weight of the reactive mixture, i.e. sum of the weights of the polyol, the polyisocyanate and all additives.

In example E, 0.67 w % of the treating agent, which is a mixture of a cyclic urea comprising an isocyanate reactive group and a free radical scavenger, was added and 0.33 w % of an amine component according to the description above. The w % is based upon the weight of the reactive mixture, i.e. sum of the weights of the polyol, the polyisocyanate and all additives.

These isocyanate reactive compositions are reacted with 52 gram of a polymeric modified MDI variant with NCO value of 32.

The resulting polyurethane foams are subjected to an emission test according to VDA 276 being the test method from the "Verband Der Automobil industrie".

All foams were made by hand mixing the components for 5 seconds at 2000 rpm. The reacting mixture was then poured in a 6.5 liter open mold. After approximately two hours of curing at room temperature, the foams (3×350 grams) were taken out of the mold, crushed and put in a TEDLAR/ALU bag and sealed.

Each foam system (3×350 grams) was then submitted to the VDA 276 test method. The aldehyde emissions were measured and quantified. The emissions measured are summarized in Table 2.

TABLE 2

Overview of VDA 276 test of polyurethane made using compositions of Table 1.

| Foam evaluations | | A | B | E |
|---|---|---|---|---|
| VDA 276 aldehyde emissions from foam @ 5 hr (65 C./5% RH/0.4 AE) | | | | |
| Formaldehyde | μg/m³/kg foam | 97 | 0 | 0 |
| Acetaldehyde | μg/m³/kg foam | 15 | 92 | 31 |
| Proprionaldehyde | μg/m³/kg foam | 54 | 34 | 54 |

From example A it is clear that when a composition is used without an amine compound and a treating agent for making polyurethane foam the emission of formaldehyde in the foam is very high.

Example B shows that when a composition comprising an amine component is used for making polyurethane foam, the emission of formaldehyde disappears or is a lot reduced. This effect was also shown in patent application with number WO2014/026802.

However, it can be seen that the addition of the amine compound induces the increase of the acetaldehyde emissions in the foam.

It was surprisingly found that when a composition comprises besides an amine compound, also a treating agent such as a cyclic urea substituted with at least one isocyanate reactive group and a free radical scavenger, which composition is used for making a polyurethane foam the formaldehyde emission in the foam remains very low but also the acetaldehyde increase is much less compared with using the amine compound alone (example E).

In total the TVOC emissions measured according to VDA 278 remains low.

It is to be understood that although preferred embodiments and/or materials have been discussed for providing embodiments according to the present invention, various modifications or changes may be made without departing from the scope and spirit of this invention.

Example 2

A polyurethane foam was prepared as described in example 1 and comprises the ingredients as provided in table 3.

The foam comprises Weston 430 which is a phosphite and is commercially available from Addivant LLC. The hydroxyethylene urea is commercially available from BASF, the polymer acid is a polyacrylic acid of 5000 Mw.

TABLE 3 ingredients of PU foam

| Ingredients used | | F | G | H |
|---|---|---|---|---|
| Daltocel ® F 428 | Pbw | 100 | 100 | 100 |
| Daltocel ® F 526 | Pbw | 4 | 4 | 4 |
| DELA | Pbw | 0.25 | 0.25 | 0.25 |
| Tegostab ® B 8734 LF-2 | Pbw | 0.9 | 0.9 | 0.9 |
| Water | Pbw | 4 | 4 | 4 |
| JEFFCAT ® LED-103 | Pbw | 0.15 | 0.15 | 0.15 |
| JEFFCAT ® DPA | Pbw | 1 | 1 | 1 |
| TEPA | Pbw | 0.25 | 0.25 | 0.25 |
| Polyacrylic acid (5000 Mw) | Pbw | | 0.25 | 0.25 |
| Weston 430 | Pbw | 0.5 | 0.5 | |
| Cyclic urea | Pbw | 0.5 | 0.5 | |
| pMDI | Pbw | 60 | 60 | 60 |
| | INDEX | 90 | 90 | 90 |

Table 4 provides the results of the VDA276 test of the aldehyde emission. It is clear that the combination of the amine compound with an antioxidant and cyclic urea (F), an antioxidant, cyclic urea and polymer acid (G) and polymer acid (H) provides a reduced aldehyde emission.

TABLE 4

Aldehyde emission in PU foam

| Foam evaluation | | F | G | H |
|---|---|---|---|---|
| VDA 276 aldehyde emissions from foam @ 5 hr (65 C./5% RT/0.4AE) | | | | |
| Formaldehyde | μg/m³/kg foam | 0 | 21 | 15 |
| Acetaldehyde | μg/m³/kg foam | 63 | 34 | 28 |

The invention claimed is:

1. A composition comprising
   at least one isocyanate reactive component selected from the group consisting of a polyether polyol, a polyester polyol, a polyether polyamine and a polyester polyamine;
   a treating agent selected from the group consisting of (i) a cyclic urea substituted with at least one isocyanate reactive group, and (ii) a mixture of a cyclic urea substituted with at least one isocyanate reactive group and a free radical scavenger, and, optionally, a polymer acid; and
   one or more amine components having a structure according to one of the formulae

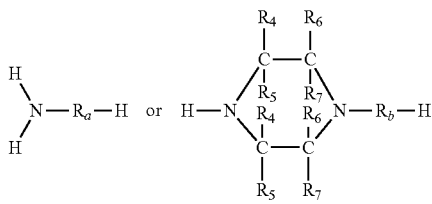

wherein Ra comprises 3 to 17 nitrogen atoms and Rb comprises 2 to 16 nitrogen atoms, and each of Ra and Rb independently comprises a plurality of units selected from at least one of $R_1$, $R_2$, and/or $R_3$, combined in a random sequence, wherein:

R1 is

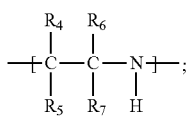

R2 is

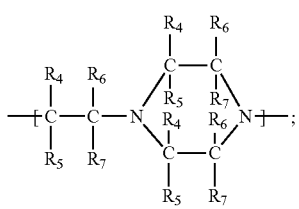

R3 is

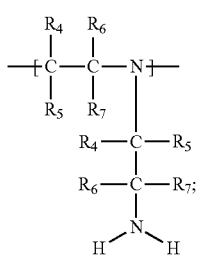

wherein each of said $R_4$, $R_5$, $R_6$ and $R_7$ individually are —H or —CH$_3$.

2. The composition according to claim 1, wherein the cyclic urea substituted with at least one isocyanate reactive group has the formula (I) or (II):

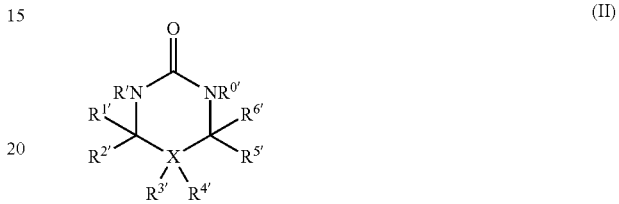

wherein R', R$^{0'}$, R$^{1'}$, R$^{2'}$, R$^{3'}$, R$^{4'}$, R$^{5'}$ and R$^{6'}$ are independently selected from H, OH, R$^{11'}$OH, NH or COOH, and
   R$^{11'}$ is a C$_1$-C$_4$ alkyl group,
   X is C, O or N with the proviso that when X is O, R$^{3'}$ and R$^{4'}$ are each zero and when X is N, one of R$^{3'}$ or R$^{4'}$ is zero, and further with the proviso at least one of R' or R$^{0'}$ is H and that at least: one of R$^{0'}$, R$^{1'}$, R$^{2'}$, R$^{3'}$, R$^{4'}$, R$^{5'}$, R$^{6'}$ is OH, COOH, R$^{11'}$OH, or NH; or R$^{1'}$R$^{2'}$ or R$^{5'}$R$^{6'}$ are NH$_2$.

3. The composition according to claim 1, wherein the cyclic urea substituted with at least one isocyanate reactive group is selected from the group consisting of 4,5-dihydroxy-2-imidazolidinone, 4,5-dimethoxy-2-imidazolidinone, 4-hydroxyethyl ethylene urea, 4-hydroxy-5-methyl propylene urea, 4-methoxy-5-methyl propylene urea, 4-hydroxy-5,5-dimethyl propylene urea, 1-(2-hydroxyethyl)-2-imidazolidinone or a mixture thereof.

4. The composition according to claim 1, wherein the free radical scavenger comprises a sterically hindered phenol having the formula (Ill):

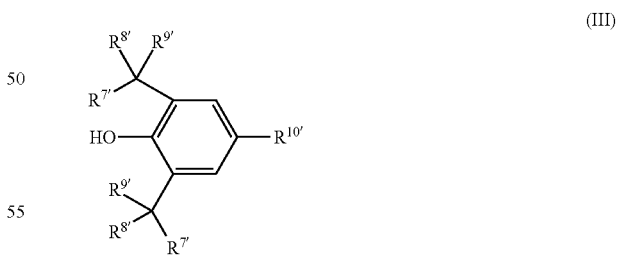

wherein R$^{7'}$, R$^{8'}$ and R$^{9'}$ are independently selected from H or a C$_1$-C$_{10}$ alkyl group.

5. The composition according to claim 1, wherein the free radical scavenger is a phosphite.

6. The composition according to claim 1, wherein the free radical scavenger is a sterically hindered amine which is a substituted diphenyl amine compound having the formula (IV):

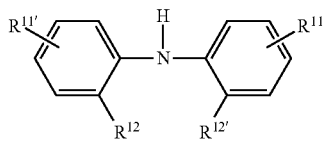

(IV)

wherein $R^{11}$ and $R^{11'}$ are independently selected from H or a $C_1$-$C_{12}$ alkyl or aryl group and $R^{12}$ and $R^{12'}$ are H or a $C_1$-$C_4$ alkyl group in case $R^{11}$ or $R^{11'}$ are not positioned at that place.

7. A composition according to claim 1, wherein the average number of nitrogen atoms of said one or more amine components is in the range of 5 to 10.

8. A composition according to claim 1, wherein said one or more amine components comprise at least one component comprising at least two primary and at least one secondary amine group.

9. A composition according to claim 1, wherein all $R_4$-, $R_5$-, $R_6$- and $R_7$-groups are hydrogen.

10. A composition according to claim 1, wherein the polymer acid contains at least three of the same repeating monomers, of either an unsaturated carboxylic acid or an anhydride; or wherein the polymer acid contains at least two repeating monomers, wherein the first monomer is an unsaturated carboxylic acid or an anhydride, and the second monomer is different from the first monomer.

11. A composition according to claim 1, wherein said one or more amine components is a mixture comprising triethyltetramines (TETA), tetraethyl pentamines (TEPA), pentaethylhexamines (PEHA), hexaethylheptamines (HEHA), heptaethyloctamines (HEOA) and/or octaethylenenonamines (OENO).

12. A composition according to claim 1, wherein the amount of the one or more amine components, in the composition is between 0.05% w to 1% w calculated on the total weight of the composition.

13. A composition according to claim 1, wherein the amount of the treating agent in the composition is between 0.05% w to 2.5% w calculated on the total weight of the composition.

14. A method for reducing the emission of formaldehyde and/or acetaldehyde from a polyurethane or polyurea foam, by using a composition in a reaction mixture to produce said polyurethane or polyurea foam, wherein the composition comprises:
   at least one isocyanate reactive component selected from the group consisting of a polyether polyol, a polyester polyol, a polyether polyamine and a polyester polyamine;
   a treating agent selected from the group consisting of (i) a cyclic urea substituted with at least one isocyanate reactive group, and (ii) a mixture of cyclic urea substituted with at least one isocyanate reactive group and a free radical scavenger, and, optionally, a polymer acid; and one or more amine components having a structure according to one of the formulae

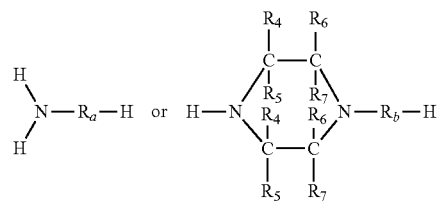

wherein Ra comprises 3 to 17 nitrogen atoms and Rb comprises 2 to 16 nitrogen atoms, and each of Ra and Rb independently comprises a plurality of units selected from at least one of $R_1$, $R_2$, and/or $R_3$, combined in a random sequence, wherein:

R1 is

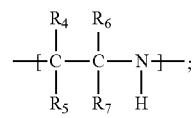

R2 is

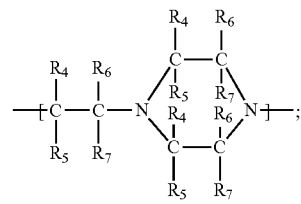

R3 is

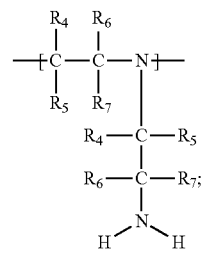

wherein each of said $R_4$, $R_5$, $R_6$ and $R_7$ individually are —H or —$CH_3$.

15. The method according to claim 14, wherein the amount of the one or more amine components in the reaction mixture is between 0.05% w to 0.5% w calculated on the total weight of the reaction mixture.

16. The method according to claim 14, wherein the amount of the treating agent in the reaction mixture is between 0.05% w to 2% w calculated on the total weight of the reaction mixture.

17. The method according to claim 14, wherein said reaction mixture further comprises at least an isocyanate component, a catalysts selected from blowing and/or gelling catalysts, and optionally fire retardants, antioxidants, surfactants, physical or chemical blowing agents, fillers, pigments, or any other typical additives used in polyurethane materials.

18. The method according to claim 14, wherein said one or more amine components is provided to the reaction mixture as part of the isocyanate reactive component selected from the group consisting of a polyether polyol, a polyester polyol, a polyether polyamine and a polyester polyamine which is a isocyanate reactive component comprising reactive hydrogen atoms.

19. A process for making the composition according to claim 1, comprising combining a treating agent and at least one isocyanate reactive component with one or more amine components having a structure according to one of the formulae

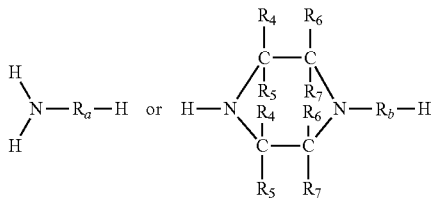

wherein Ra comprises 3 to 17 nitrogen atoms and Rb comprises 2 to 16 nitrogen atoms, and each of Ra and Rb independently comprises a plurality of units selected from at least one of $R_1$, $R_2$ and/or $R_3$, combined in a random sequence, wherein:

R1 is

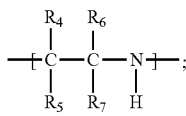

R2 is

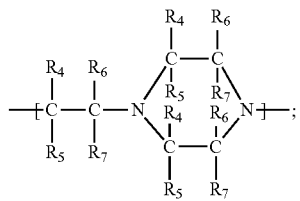

R3 is

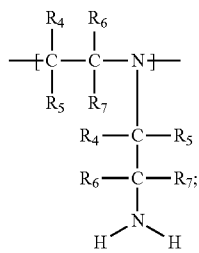

wherein each of said $R_4$, $R_5$, $R_6$ and $R_7$ individually are —H or —$CH_3$;
wherein:
(i) the treating agent is selected from the group consisting of (i) a cyclic urea substituted with at least one isocyanate reactive group, and (ii) a mixture of cyclic urea substituted with at least one isocyanate reactive group and a free radical scavenger, and, optionally, a polymer acid; and
(ii) the at least one isocyanate reactive component is selected from the group consisting of a polyether polyol, a polyester polyol, a polyether polyamine and a polyester polyamine.

20. The process according to claim 19, wherein the treating agent comprises a mixture of cyclic urea substituted with at least one isocyanate reactive group, a free radical scavenger, and a polymer acid, and wherein the polymer acid is added to the one or more amine component before adding the mixture of cyclic urea substituted with at least one isocyanate reactive group or the free radical scavenger.

* * * * *